(12) United States Patent
Hinami et al.

(10) Patent No.: US 7,540,824 B2
(45) Date of Patent: Jun. 2, 2009

(54) CONTROL APPARATUS FOR AUTOMATIC TRANSMISSION

(75) Inventors: Takashige Hinami, Fuji (JP); Kazunari Otake, Fuji (JP)

(73) Assignee: Jatco Ltd (JP)

( * ) Notice: Subject to any disclaimer, the term of this patent is extended or adjusted under 35 U.S.C. 154(b) by 398 days.

(21) Appl. No.: 11/485,951

(22) Filed: Jul. 13, 2006

(65) Prior Publication Data

US 2007/0015627 A1 Jan. 18, 2007

(30) Foreign Application Priority Data

Jul. 14, 2005 (JP) ............................. 2005-205420

(51) Int. Cl.
*F16H 61/16* (2006.01)
*F16H 61/18* (2006.01)
*G06F 7/00* (2006.01)
*G06F 17/00* (2006.01)
*G06F 19/00* (2006.01)

(52) U.S. Cl. ........................................ 477/126; 701/62
(58) Field of Classification Search .............. 74/473.21, 74/473.22; 477/125, 126; 701/62
See application file for complete search history.

(56) References Cited

U.S. PATENT DOCUMENTS

| 3,164,030 A | * | 1/1965 | Fodrea et al. | ............ | 74/473.26 |
| 3,438,469 A | * | 4/1969 | Hilpert | ...................... | 192/3.57 |
| 3,998,110 A | * | 12/1976 | O'Brien et al. | .......... | 74/473.22 |
| 6,659,255 B2 | * | 12/2003 | Syamoto et al. | .......... | 192/220.4 |
| 2004/0226801 A1 | * | 11/2004 | De Jonge et al. | ......... | 192/220.7 |

FOREIGN PATENT DOCUMENTS

| JP | 62-76027 U | 5/1987 |
| JP | 4-203663 A | 7/1992 |
| JP | 5-126248 A | 5/1993 |
| JP | 6-17922 A | 1/1994 |
| JP | 6-272757 A | 9/1994 |
| JP | 2004-60804 A | 2/2004 |

OTHER PUBLICATIONS

Notice of Reasons for Refusal issued in corresponding JP application No. 2005-205420 dated Nov. 11, 2008.

* cited by examiner

*Primary Examiner*—Tisha D Lewis
(74) *Attorney, Agent, or Firm*—Rossi, Kimms & McDowell, LLP (57) ABSTRACT

There is provided a control apparatus for a vehicular automatic transmission which reliably inhibits switching between ranges caused by an erroneous operation of a shift lever and enables a vehicle to continue running normally without interfering with the operation of returning the shift lever to a normal position. When the shift lever is switched to a reverse range in a state in which a flag Flag_D_high indicative of a forward high vehicle speed assumes "1", this operation is determined as being an erroneous operation, and gear shift to a reverse gear position is inhibited from being accomplished. When the shift lever is switched to a forward range in a state in which a flag Flag_R_high indicative of a reverse high vehicle speed assumes "1", this operation is determined as being an erroneous operation, and gear shift to a forward gear position is inhibited from being accomplished.

9 Claims, 6 Drawing Sheets

|   |   | LOW/C | 2-6/B | 3-5R/C | H/C | L&R/B | LOW/OWC |
|---|---|---|---|---|---|---|---|
|   | P |   |   |   |   |   |   |
|   | R |   |   | ○ |   | ○ |   |
|   | N |   |   |   |   |   |   |
| D | 1st | ○ |   |   |   | ⊗ | ● |
|   | 2nd | ○ | ○ |   |   |   |   |
|   | 3rd | ○ |   | ○ |   |   |   |
|   | 4th | ○ |   |   | ○ |   |   |
|   | 5th |   |   | ○ | ○ |   |   |
|   | 6th |   | ○ |   | ○ |   |   |

CONTROL APPARATUS FOR AUTOMATIC TRANSMISSION

BACKGROUND OF THE INVENTION

1. Field of the Invention

The present invention relates to a control apparatus for a vehicular automatic transmission, and more particularly to a control apparatus for an automatic transmission which inhibits switching between ranges when a shift lever is erroneously operated.

2. Description of the Prior Art

When a shift lever is erroneously switched to a reverse range in forward driving of a vehicle, and when the shift lever is switched to a forward range in reverse driving, hard braking occurs to cause engine stop. To prevent this, it is necessary to inhibit accomplishment of gear shift to the selected range without engaging friction elements that should be engaged in response to the switching operation.

To this end, it is disclosed in Japanese Laid-Open Patent Publication No. H06-272757 that control is provided such that when a shift lever is switched from a forward range to a reverse range in driving of a vehicle at a predetermined vehicle speed or higher, gear shift to a reverse gear position is inhibited from being accomplished, and when the shift lever is switched from the reverse range to the forward range, the gear position is temporarily changed to the third speed gear position.

As another example, it is disclosed in Japanese Laid-Open Patent Publication No. H05-126248 that control is provided such that when a shift lever is switched from one range to another, the range that has been continuously set for a predetermined period of time and the newly selected range are compared with each other, and when they are different, gear shift to the newly selected range is inhibited from being accomplished.

According to Japanese Laid-Open Patent Publication No. H06-272757, when the range is switched to the forward range in response to an erroneous operation of a shift lever, the gear position is temporarily changed to the third speed gear position. However, even when a driver notices the erroneous operation and returns the shift lever to the normal position (reverse range), accomplishment of gear shift to a reverse gear position is inhibited by inhibition control, and hence the gear position is kept at the forward third speed gear position irrespective of the driver's operation, and therefore the vehicle cannot run rearward.

Also, in the case where the shift lever is erroneously switched to the reverse range while the vehicle is running forward, when the driver notices the erroneous operation and returns the shift lever from the reverse range to the normal position (forward range) with gear shift to a reverse gear position being not accomplished, this operation is also determined as being an erroneous operation, and the gear position is switched to the forward third speed gear position, thereby causing driving force to be considerably changed as compared with the original driving force.

On the other hand, according to Japanese Laid-Open Patent Publication No. H05-126248, whether switching between ranges is to be accomplished or not is determined based on a range that has been continuously set for a predetermined period of time, but for example, when switching between the forward range and the reverse range by the shift lever as in the case where a vehicle is turned in a K-turn in a parking lot is a normal operation suited to the driver's intension, gear shift to a gear position of the range selected by the shift lever needs to be accomplished as fast as possible from the standpoint of responsiveness, and therefore it is preferred that the above-mentioned predetermined period of time is short. If, however, the predetermined period of time is set to be short, there is a problem that in the case where the shift lever is erroneously operated while the vehicle is running at a high speed, the range is switched to the range selected by the erroneous operation before the vehicle speed becomes low, and hence the occurrence of engine stop cannot be prevented.

SUMMARY OF THE INVENTION

It is therefore an object of the present invention to provide a control apparatus for an automatic transmission which reliably inhibits switching between ranges caused by an erroneous operation of a shift lever and enables a vehicle to continue running normally without interfering with the operation of returning the shift lever to a normal position.

To attain the above object, there is provided a control apparatus for an automatic transmission in which a range from a forward range and a reverse range is selected by a shift lever, comprising: a first erroneous operation determining means responsive to an operation to switch the shift lever from the forward range to the reverse range when a vehicle speed lies in a first high-speed driving state, for determining that the operation is an erroneous operation; a first inhibiting means for inhibiting accomplishment of gear shift to a reverse gear position when the first erroneous operation determining means determines that the operation is an erroneous operation; a second erroneous operation determining means responsive to an operation to switch the shift lever from the reverse range to the forward range when the vehicle speed lies in a second high-speed driving state, for determining that the operation is an erroneous operation; a second inhibiting means for inhibiting accomplishment of gear shift to a forward gear position when the second erroneous operation determining means determines that the operation is an erroneous operation; a first permitting means for accomplishing gear shift to a gear position in a range selected by the shift lever without activating the second inhibiting means when the shift lever is switched from the reverse range to a range other than the reverse range while accomplishment of gear shift to a reverse gear position is inhibited by the first inhibiting means being in operation; and a second permitting means for accomplishing gear shift to a gear position in a range selected by the shift lever without activating the first inhibiting means when the shift lever is switched from the forward range to a range other than the forward range while accomplishment of gear shift to a forward gear position is inhibited by the second inhibiting means being in operation.

With the above arrangement of the present invention, when the shift lever is switched between the forward and the reverse ranges due to an erroneous operation, the first or second inhibiting means is activated to inhibit accomplishment of gear shift to the range selected by the erroneous operation, and therefore engine stop can be prevented.

On the other hand, when the shift lever is returned to the previous range while the first or second inhibiting means is in operation, the first or second inhibiting means is not activated even though the shift lever is switched between the forward and the backward ranges, and gear shift to the range selected by the shift lever is accomplished through operation of the first or second permitting means. As a result, the range can be returned to the previous range suited to the driving condition before the erroneous operation, so that the vehicle can continue to run normally.

Other features and advantages of the present invention will become apparent from the following detailed description taken in conjunction with the accompanying drawings, in which same reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present invention will now be described in detail with reference to the drawings showing a preferred embodiment thereof.

Figure 1:
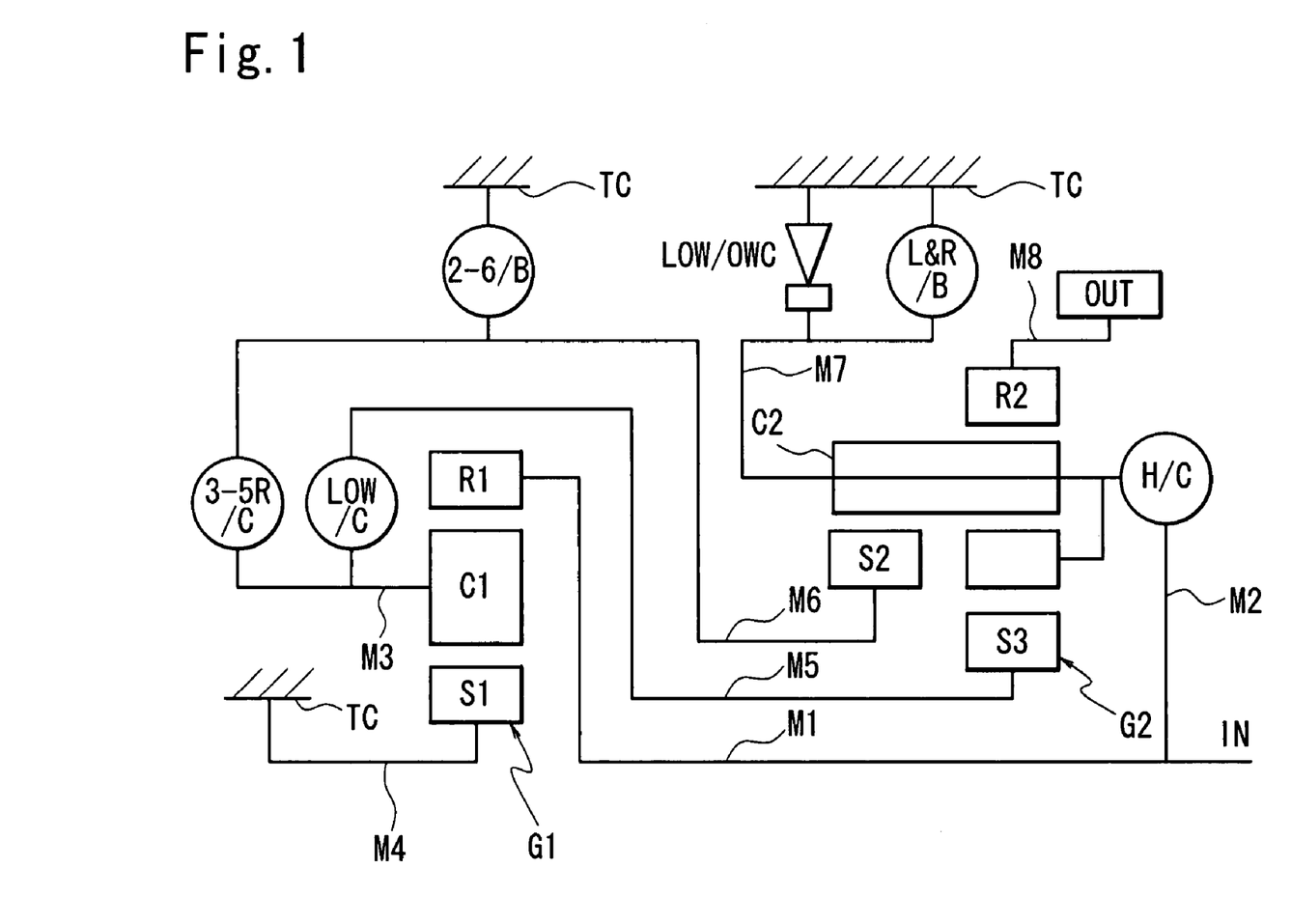
FIG. 1 is a skeleton diagram showing gear trains of an automatic transmission to which an embodiment of the present invention is applied.

FIG. 1 is a skeleton diagram showing gear trains of an automatic transmission to which an embodiment of the present invention is applied.

This automatic transmission is comprised of a simple planetary-gear set G1 and a Ravigneaus type planetary-gear set G2. The planetary-gear set G1 is comprised of a first sun gear S1, a first ring gear R1, and a first carrier C1 which supports pinions. The planetary-gear set G2 is comprised of a second sun gear S2, a third sun gear S3, a second ring gear R2, and a second carrier C2 which supports sets of two pinions.

An input shaft IN to which driving force is input from an engine via a torque converter, both of which are not shown, is connected directly to the first ring gear R1 via a first member M1. The input shaft IN is also connected directly to the second carrier C2 via a second member M2 and a high clutch H/C.

The first carrier C1 is connected to the third sun gear S3 via a third member M3, a low clutch LOW/C, and a fifth member M5. The first carrier C1 is also connected to the second sun gear S2 via the third member M3, a 3-5 reverse clutch 3-5R/C, and a sixth member M6. The sixth member M6 can be fixed or released to and from a transmission case TC via a 2-6 brake 2-6/B.

The sun gear S1 is fixed to the transmission case TC via a fourth member M4. The second carrier C2 is supported on the transmission case TC via a seventh member M7, a low-and-reverse brake L&R/B and a low one-way clutch LOW/OWC which is arranged in parallel with the low-and-reverse brake L&R/B, such that the second carrier C2 may rotate in one direction and may be inhibited from being rotated (fixed) and released from the rotation-inhibited state.

The ring gear R2 is connected to an output gear OUT via an eighth member M8.

Figure 2:
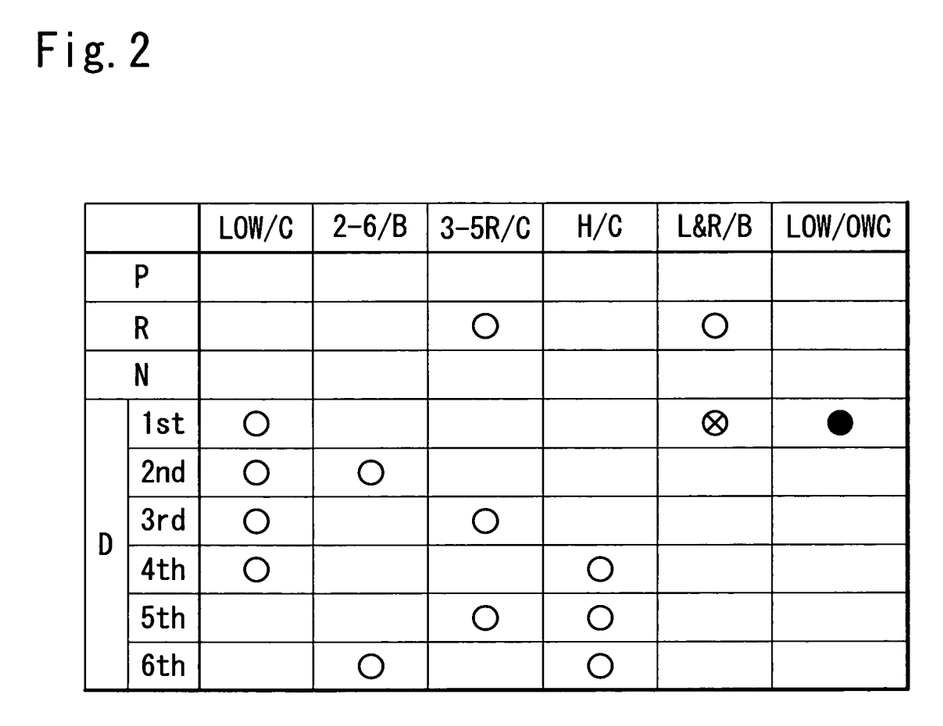
FIG. 2 is a diagram showing combinations of engaged/disengaged friction elements.

The automatic transmission constructed as described above realizes six forward speed gear positions (1st to 6th) and one reverse (Rev) gear position based on the combinations of engaging and disengaging friction elements shown in FIG. 2. In FIG. 2, the circular mark indicates that the concerned friction element is engaged, no mark indicates that the concerned friction element is disengaged, the circular mark with x indicates that the concerned friction element is engaged and operable at the time of engine braking. And the black-out circle indicates that the concerned friction element is mechanically engaged (inhibited from rotating) when the engine outputs a driving force.

Figure 3:
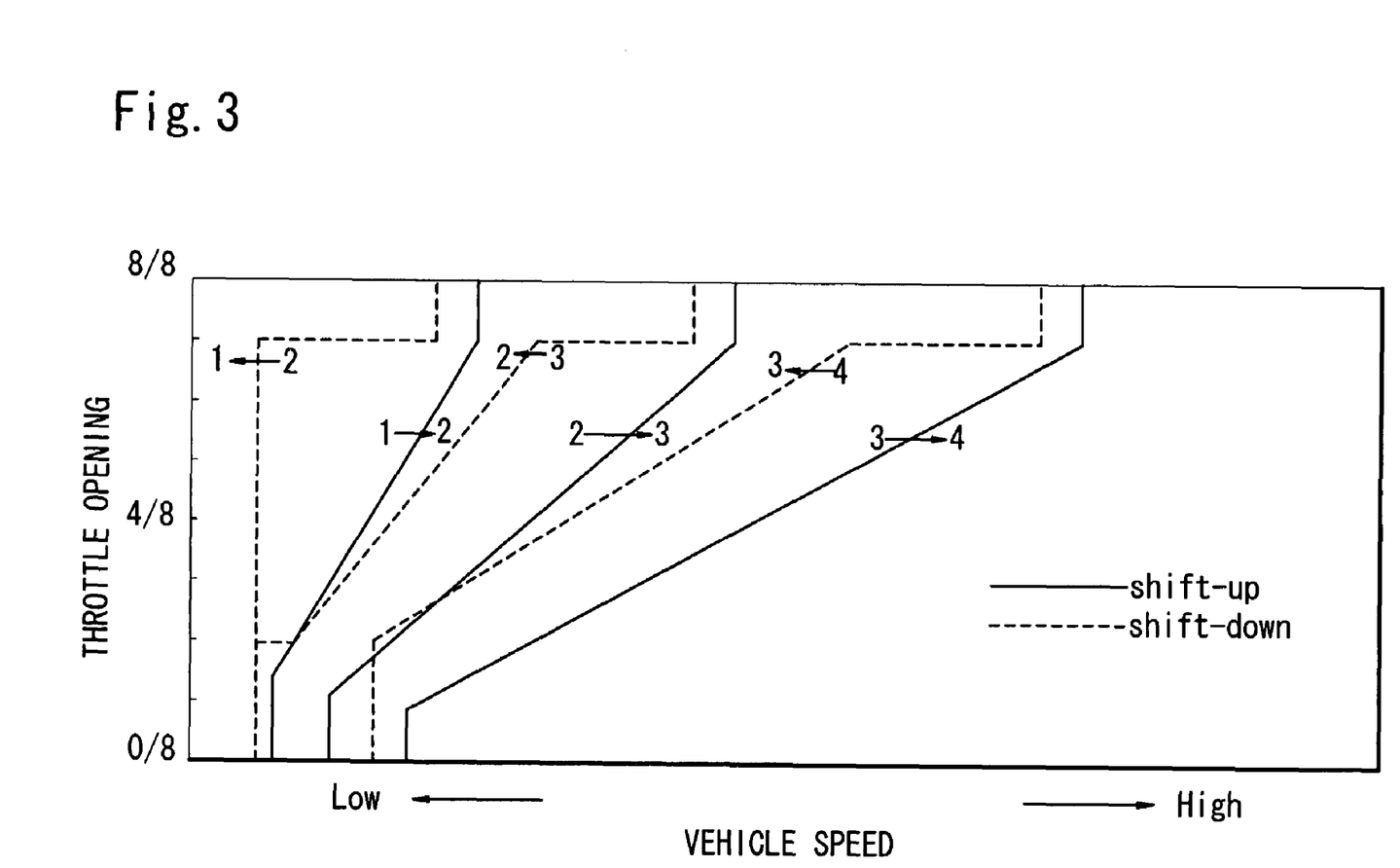
FIG. 3 is a diagram showing a gear shift schedule.

As shown in FIG. 3, in the D range, automatic gear shifting between the six forward speed gear positions is carried out according to a gear shift schedule set based on the vehicle speed and the throttle opening angle. Also, gear shifting to achieve the one reverse gear position is carried out by switching the shift lever from the D range to the R range.

Referring next to FIGS. 1 and 2, a description will be given of rotation transmission paths for respective speed gear positions.

The first speed (1st) gear position is achieved by engagement of the low clutch LOW/C and engagement of the low-and-reverse brake L&R/B.

The engine rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second carrier C2 fixed to the transmission case TC by engagement of the low one-way clutch LOW/OWC, rotates while decelerating, and the decelerated rotation at the maximum reduction ratio is output from the output gear OUT through the eighth member M8. It should be noted that at the time of engine braking, the low-and-reverse brake L&R/B is subjected to the reactive force in place of the idling low one-way clutch LOW/OWC.

The second speed (2nd) gear position is achieved by engagement of the low clutch LOW/C and engagement of the 2-6 brake 2-6/B.

The rotation from the input shaft IN is decelerated through the first member M1 and the planetary-gear set G1, and the decelerated rotation is input to the third sun gear S3 from the third member M3 through the low clutch LOW/C and the fifth member M5. In the planetary-gear set G2, the second ring gear R2, being subjected to reactive force from the second sun gear S2 fixed to the transmission case TC by engagement of the 2-6 brake 2-6/B, rotates while decelerating, and the decelerated rotation at a smaller reduction ratio as compared with the first speed gear position is output from the output gear OUT through the eighth member M8.

The third speed (3rd) gear position is achieved by engagement of the low clutch LOW/C and engagement of the 3-5 reverse clutch 3-5R/C.

The rotation from the input shaft IN is decelerated through the first member M1 and the planetary-gear set G1, and the decelerated rotation input to the third sun gear S3 from the third member M3 through the low clutch LOW/C and the fifth member M5. The rotation from the third member M3 is input to the second sun gear S2 as well through the 3-5 reverse clutch 3-5R/C and the sixth member M6.

As a result, the Ravigneaux type planetary-gear set G2 is brought into a directly-connected state, and hence the second ring gear R2 rotates at the same speed as the speed at which the sun gears S2 and S3 rotate, and the decelerated rotation at a smaller reduction ratio as compared with the second speed is output from the output gear OUT through the eighth member M8.

The fourth speed (4th) gear position is achieved by engagement of the low clutch LOW/C and engagement of the high clutch H/C.

The rotation from the input shaft IN is decelerated through the first member M1 and the planetary-gear set G1, and the decelerated rotation is input to the third sun gear S3 from the third member M3 through the low clutch LOW/C and the fifth member M5.

Further, the same rotation as the rotation at the input shaft IN is input from the input shaft IN to the second carrier C2 through the second member M2 and the high clutch H/C.

In the planetary-gear set G2, the second ring gear R2 to rotates at a speed intermediate between the two rotations input as above, and the rotation decelerated slightly as compared with the input rotation is output from the output gear OUT through the eighth member M8.

The fifth speed (5th) gear position is achieved by engagement of the 3-5 reverse clutch 3-5 R/C and engagement of the high clutch H/C.

The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

Further, the same rotation as the rotation at the input shaft IN is input from the input shaft IN to the second carrier C2 through the second member M2 and the high clutch H/C.

In the planetary-gear set G2, the second ring gear R2 rotates while being restrained by the two rotations input as above, and the rotation accelerated slightly as compared with the input rotation is output from the output gear OUT through the eighth member M8.

The sixth speed (6th) gear position is achieved by engagement of the high clutch H/C and engagement of the 2-6 brake 2-6/B.

The same rotation as the rotation at the input shaft IN is input from the input shaft IN to only the second carrier C2 through the second member M2 and the high clutch H/C.

In the planetary-gear set G2, the second ring gear R2, being subjected to reactive force from the second sun gear S2 fixed to the transmission case TC by engagement of the 2-6 brake 2-6/B, rotates while accelerating, and the rotation accelerated as compared with the fifth speed gear position is output from the output gear OUT through the eighth member M8.

The reverse speed (Rev) gear position is achieved by engagement of the 3-5 reverse clutch 3-5 R/C and engagement of the low-and-reverse brake L&R/B.

The rotation from the input shaft IN is decelerated through the first member M1 and the planetary-gear set G1, and the decelerated rotation is input to the second sun gear S2 from the third member M3 through the 3-5 reverse clutch 3-5R/C and the sixth member M6.

The second ring gear R2, being subjected to reactive force from the second carrier C2 fixed to the transmission case TC by engagement of the low-and-reverse brake L&R/B, rotates in the reverse direction, and the decelerated reverse rotation is output from the output gear OUT through the eighth member M8.

Figure 4:
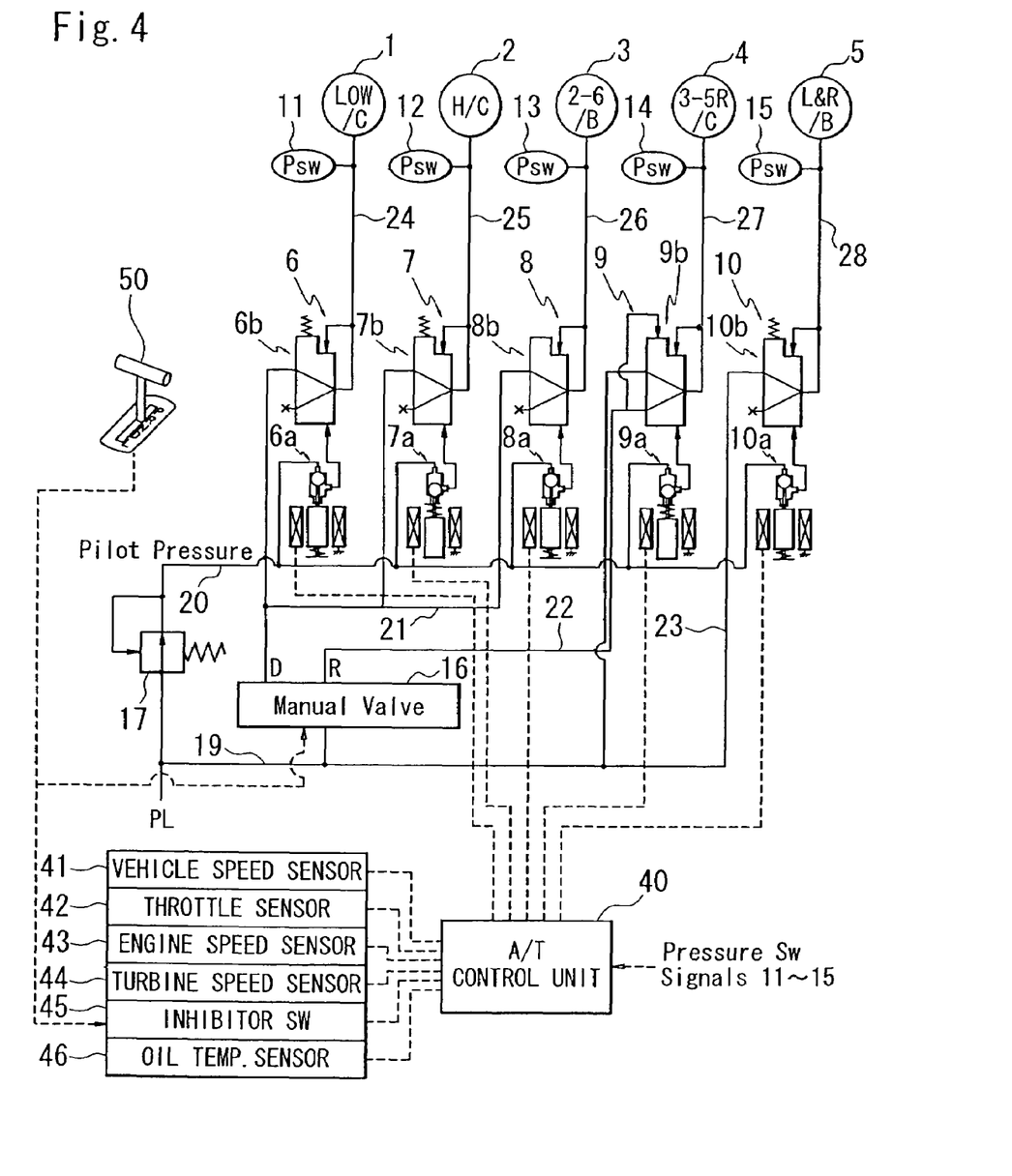
FIG. 4 is a diagram showing a hydraulic circuit and an electronic gearshift control system.

FIG. 4 is a diagram showing a hydraulic circuit and an electronic shift control system for carrying out the shift control described above.

The low-clutch LOW/C, the high clutch H/C, the 2-6 brake 2-6/B, the 3-5 reverse clutch 3-5R/C, and the low-and-reverse brake L&R/B are engaged by supplying engagement pressure which is D range pressure or R range pressure to engagement piston chambers 1 to 5 and disengaged by releasing the engagement pressure.

It should be noted that D range pressure is line pressure through a manual valve, described later, and is generated only when the D range is selected. The R range pressure is line pressure through the manual valve and is generated only when the R range is selected; when any other range is selected, no pressure is generated because of switching to a drain port, not shown.

The engagement pressure (low clutch pressure) to the engagement piston chamber 1 of the low clutch LOW/C is controlled by a first hydraulic control valve 6.

The engagement pressure (high clutch pressure) to the engagement piston chamber 2 of the high clutch H/C is controlled by a second hydraulic control valve 7.

The engagement pressure (2-6 brake pressure) to the engagement piston chamber 3 of the 2-6 brake 2-6/B is controlled by a third hydraulic control valve 8.

The engagement pressure (3-5 reverse clutch pressure) to the engagement piston chamber 4 of the 3-5 reverse clutch 3-5R/C is controlled by a fourth hydraulic control valve 9.

The engagement pressure (low-and-reverse brake pressure) to the engagement piston chamber 5 of the low-and-reverse brake L&R/B is controlled by a fifth hydraulic control valve 10.

The D range pressure (D) from a manual valve 16 is supplied to the first to third hydraulic control valves 6 to 8 through a D range pressure oil passage 21. The line pressure PL is supplied to the manual valve 16 through a line pressure oil passage 19.

The line pressure PL is directly supplied to the fourth hydraulic control valve 9, and the R range pressure (R) from the manual valve 16 is supplied to the fourth hydraulic control valve 9 through an R range pressure oil passage 22.

The line pressure PL is directly supplied to the fifth hydraulic control valve 10

Pilot pressure obtained by regulating the line pressure PL with a pilot valve 17 is supplied to the hydraulic control valves 6 to 10 through a pilot pressure oil passage 20.

The first hydraulic control valve 6 is comprised of a first duty solenoid 6a that produces shift control pressure using pilot pressure as the original pressure and by solenoid force, and a first regulating valve 6b that regulates low clutch pressure using D range pressure as the original pressure and using shift control pressure and feedback pressure as actuating signal pressure.

The first duty solenoid 6a is controlled according to a duty ratio. Specifically, the first duty solenoid 6a controls the low clutch pressure to zero in the solenoid OFF state and increases the low clutch pressure in the solenoid ON state as the ON duty ratio increases.

The second hydraulic control valve 7 is comprised of a second duty solenoid 7a that produces shift control pressure using pilot pressure as the original pressure and by solenoid force, and a second regulating valve 7b that regulates high clutch pressure using D range pressure as the original pressure and using shift control pressure and feedback pressure as actuating signal pressure.

The second duty solenoid 7a controls the high clutch pressure to zero in the solenoid ON state (an ON duty ratio of 100%), increases the high clutch pressure as the ON duty ratio decreases, and controls the high clutch pressure to the maximum in the solenoid OFF state.

The third hydraulic control valve 8 is comprised of a third duty solenoid 8a that produces shift control pressure using pilot pressure as the original pressure and by solenoid force, and a third regulating valve 8b that regulates 2-6 brake pressure using D range pressure as the original pressure and using shift control pressure and feedback pressure as actuating signal pressure.

The third duty solenoid 8a controls the 2-6 brake pressure to zero in the solenoid OFF state and increases the 2-6 brake pressure in the solenoid ON state as the ON duty ratio increases.

The fourth hydraulic control valve 9 is comprised of a fourth duty solenoid 9a that produces shift control pressure using pilot pressure as the original pressure and by solenoid force, and a fourth regulating valve 9b that regulates 3-5 reverse clutch pressure using line pressure as the original pressure and using shift control pressure and feedback pressure as actuating signal pressure when the D range is selected, and supplies line pressure as R range pressure directly to the 3-5 reverse clutch 3-5 R/C using R range pressure as actuating signal pressure when the R range is selected.

The fourth duty solenoid 9a controls the 3-5 reverse clutch pressure to zero in the solenoid ON state (an ON duty ratio of 100%), increases the 3-5 reverse clutch pressure as the ON duty ratio decreases, and controls the 3-5 reverse clutch pressure to the maximum in the solenoid OFF state.

The fifth hydraulic control valve 10 is comprised of a fifth duty solenoid 10a that produces shift control pressure using pilot pressure as the original pressure and by solenoid force, and a fifth regulating valve 10b that regulates low-and-reverse brake pressure using line pressure as the original pressure and using shift control pressure and feedback pressure as actuating signal pressure.

The fifth duty solenoid 10a controls the low-and-reverse brake pressure to zero in the solenoid OFF state and increases the low-and-reverse brake pressure in the solenoid ON state as the ON duty ratio increases.

A first pressure switch 11 is provided in a low clutch pressure oil passage 24 connecting the first hydraulic control valve 6 and the engagement piston chamber 1.

A second pressure switch 12 is provided in a high clutch pressure oil passage 25 connecting the second hydraulic control valve 7 and the engagement piston chamber 2.

A third pressure switch 13 is provided in a 2-6 brake pressure oil passage 26 connecting the third hydraulic control valve 8 and the engagement piston chamber 3.

A fourth pressure switch 14 is provided in a 3-5 reverse clutch pressure oil passage 27 connecting the fourth hydraulic control valve 9 and the engagement piston chamber 4.

A fifth pressure switch 15 is provided in a low-and-reverse brake pressure oil passage 28 connecting the fifth hydraulic control valve 10 and the engagement piston chamber 5.

Each of the first to fifth pressure switches 11 to 15 outputs an ON signal when engagement pressure is supplied and outputs an OFF signal when engagement pressure is not supplied.

The electronic shift control system is comprised of an A/T control unit 40 to which signals from a vehicle speed sensor 41, a throttle sensor 42, an engine speed sensor 43, a turbine rotational speed sensor 44, an inhibitor switch 45, and an oil temperature sensor 46 are input. Signals from the pressure switches 11 to 15 are also input to the A/T control unit 40.

The A/T control unit 40 performs computations based on the above input signals and under a shift control rule, a fail-safe control rule, and so forth set in advance and outputs solenoid driving signals as engaging commands or disengaging commands according to the computation results to the first to fifth duty solenoids 6a to 10a.

Also, in a driving state, in response to an erroneous operation of a shift lever 50 such as switching from the forward range to the reverse range or from the reverse range to the forward range, the A/T control unit 40 provides control to inhibit switching between ranges without carrying out unnecessary engagement of friction elements.

In the following description, the forward range will be referred to as "the D range" and the reverse range as the "R range."

The inhibition control is carried out with reference to the results of vehicle speed determination carried out concurrently while the vehicle is running.

Figure 5:
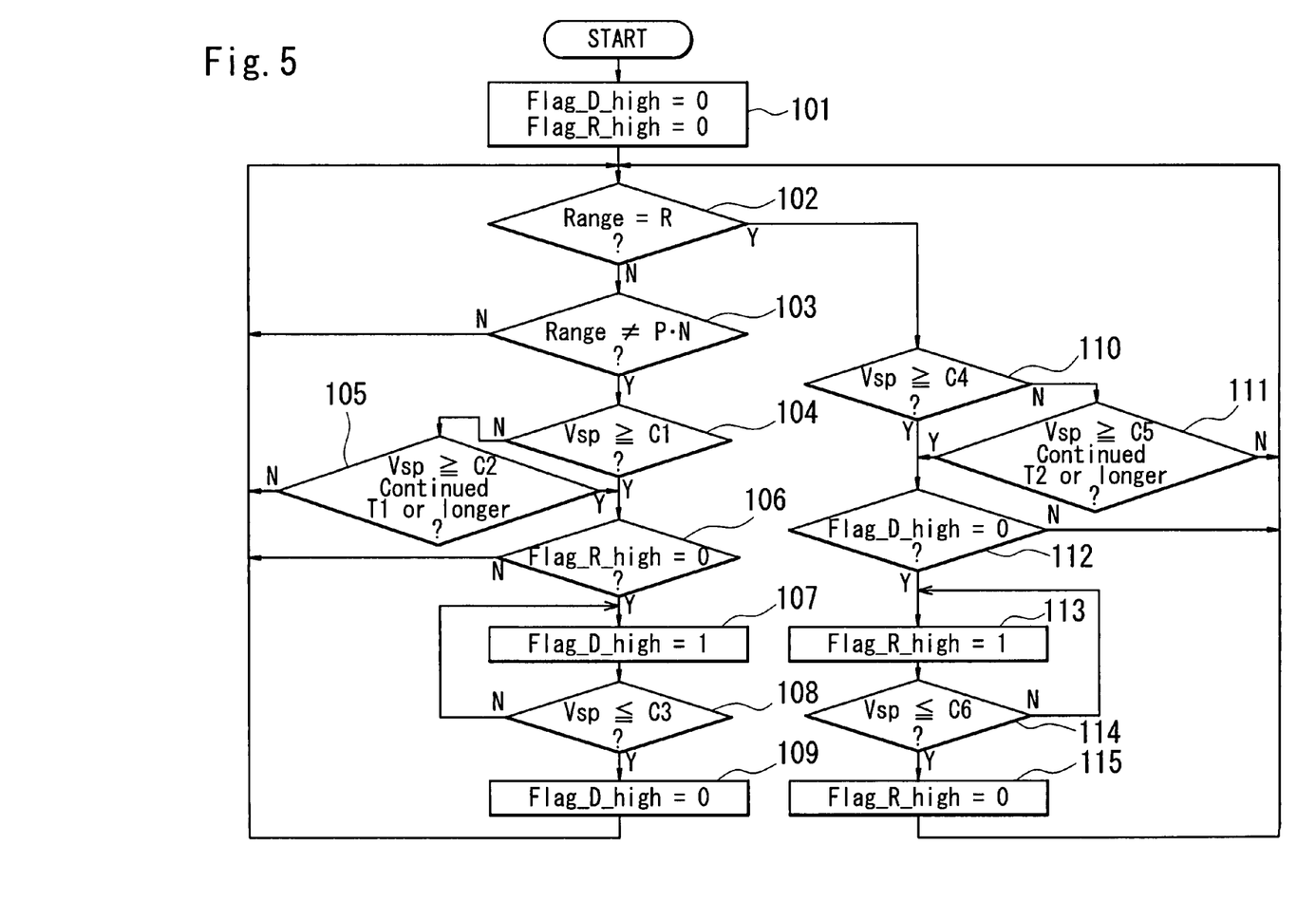
FIG. 5 is a flow chart showing a procedure for carrying out vehicle speed determination.

FIG. 5 is a flow chart showing the process of carrying out vehicle speed determination. This process is started in response to turning-on of an ignition key, not shown, of the vehicle and indicates a forward high-speed state or a reverse high-speed state using flags.

First, in a step 101, a forward high-speed experience flag (Flag_D_high) and a reverse high-speed experience flag (Flag_R_high) are reset to "0."

In a step 102, it is checked whether or not the shift lever 50 is positioned at the R range. The position of the shift lever 50 is found based on a signal from the inhibitor switch 45 attached to a link connecting the shift lever 50 and the manual valve 16.

When the shift lever 50 is positioned at the R range, the process proceeds to a step 110, and when the shift lever 50 is not positioned at the R range, the process proceeds to a step 103.

In the step 103, it is checked whether or not the shift lever 50 is positioned at a range other than the P (parking) range or N (neutral) range, i.e. whether or not the shift lever 50 is positioned at the D range.

When the shift lever 50 is positioned at the D range, the process proceeds to a step 104, and when the shift lever 50 is not positioned at the D range, i.e. the shift lever 50 is positioned at the P or N range, the process returns to the step 102.

In the step 104, it is checked whether or not the vehicle speed Vsp is not less than a predetermined value C1 (for example, 12 km/h) indicative of a high speed, and when the vehicle speed Vsp is a high speed not less than the predetermined value C1, the process proceeds to a step 106. The predetermined value C1 is a value that is set from the viewpoint of preventing engine stop; when the shift lever 50 is switched to the R range while the vehicle is running at a speed not less than the predetermined value C1, engine stop may occur.

On the other hand, when the vehicle speed Vsp is less than the predetermined value C1, the process proceeds to a step 105. In the step 105, it is checked whether or not a state in which the vehicle speed Vsp is not less than a predetermined value C2 (for example, 8 km/h) assuming a state in which the vehicle is being turned in a K-turn in a parking lot or the like has been continuing for a predetermined period of time T1 or longer, and when this state has been continuing for the predetermined period of time T1 or longer, the process proceeds to the step 106.

In the step 106, it is checked whether or not the reverse high-speed experience flag assumes "0" (Flag_R_high=0).

When the reverse high-speed experience flag assumes "0", the process proceeds to a step 107 wherein the forward high-speed experience flag is set to "1" (Flag_D_high=1). This means that up to the present time, the vehicle has been running forward at a relatively high speed at which engine stop would occur if the shift lever 50 is switched to the R range.

On the other hand, when the reverse high-speed experience flag assumes "1", the process returns to the step 102. Thus, the forward high-speed experience flag does not assume "1" at the same time when the reverse high-speed experience flag assumes "1."

After the forward high-speed experience flag is set to "1" in the step 107, the process proceeds to a step 108 wherein it is checked whether or not the vehicle speed Vsp has decreased to not more than a predetermined value C3 (for example, 5 km/h) indicative of a low speed. When the vehicle speed Vsp is higher than the predetermined value C3, the process returns to the step 107 wherein the state in which the forward high-speed experience flag assumes "1" is continued. The predetermined value C3 is a value that is obtained by applying hysteresis to the predetermined value C2 so as to prevent hunting.

When it is determined in the step 108 that the vehicle speed Vsp has become equal to the predetermined value C3 or lower, the forward high-speed experience flag is reset in a step 109, and the process then returns to the step 102.

When it is determined in the step 105 that the vehicle speed Vsp is less then the predetermined value C2, or the vehicle speed Vsp is not less than the predetermined value C2 but this state has not been continuing for the predetermined period of time T1, the process returns to the step 102 to carry out the above described process again.

In the step 110 to which the process proceeds from the step 102 when the shift lever 50 is positioned at the R range, it is checked whether or not the vehicle speed Vsp is not less than a predetermined value C4 (for example, 9 km/h) indicative of a high speed. When the vehicle speed Vsp is a high speed not less than the predetermined value C4, the process proceeds to a step 112.

The predetermined value C4 is a value that is set from the viewpoint of preventing engine stop as is the case with the predetermined value C1.

The engine speed ne is expressed by the following equation:

$$ne = G \times Vsp$$

where G=gear ratio.

Thus, assuming the engine speed ne at which engine stop occurs is fixed, the greater the gear ratio is, the lower the vehicle speed Vsp is. The gear ratio in the R range is greater than gear ratios of all the gear positions in the D range, and hence the predetermined value C4 intended to prevent the occurrence of engine stop is set to be a smaller value than the predetermined value C1.

On the other hand, when the vehicle speed Vsp is less than the predetermined value C4, the process proceeds to a step 111. In the step 111, it is checked whether or not a state in which the vehicle speed Vsp is not less than a predetermined value C5 (for example, 7 km/h) assuming a state in which the vehicle is being turned in a K-turn in a parking lot or the like has been continuing for a predetermined period of time T2 or longer, and when this state has been continuing for the predetermined period of time T2 or longer, the process proceeds to the step 112. The predetermined period of time T2 may have the same value as the period of time T1.

In the step 112, it is checked whether or not the forward high-speed experience flag assumes "0" (Flag_D_high=0).

When the forward high-speed experience flag assumes "0", the process proceeds to a step 113 wherein the reverse high-speed experience flag is set to "1" (Flag_R_high=1). This means that up to the present time, the vehicle has been running rearward at a relatively high speed at which engine stop would occur if the shift lever 50 is switched to the D range.

On the other hand, when the forward high-speed experience flag assumes "1", the process returns to the step 102. Thus, the reverse high-speed experience flag does not assume "1" at the same time when the forward high-speed experience flag assumes "1."

After the reverse high-speed experience flag is set to "1" in the step 113, the process proceeds to a step 114 wherein it is checked whether or not the vehicle speed Vsp has decreased to not more than a predetermined value C6 (for example, 5 km/h) indicative of a low speed. When the vehicle speed Vsp is higher than the predetermined value C6, the process returns to the step 113 wherein the state in which the reverse high-speed experience flag assumes "1" is continued. The predetermined value C6 is a value that is obtained by applying hysteresis to the predetermined value C5 so as to prevent hunting.

When it is determined in the step 114 that the vehicle speed Vsp has become not more than the predetermined value C6, the reverse high-speed experience flag is reset in a step 115, and the process then returns to the step 102.

When it is determined in the step 111 that the vehicle speed Vsp is less then the predetermined value C5, or the vehicle speed Vsp is not less than the predetermined value C5 but this state has not been continuing for the predetermined period of time T2, the process returns to the step 102 to carry out the above described process again.

Figure 6:
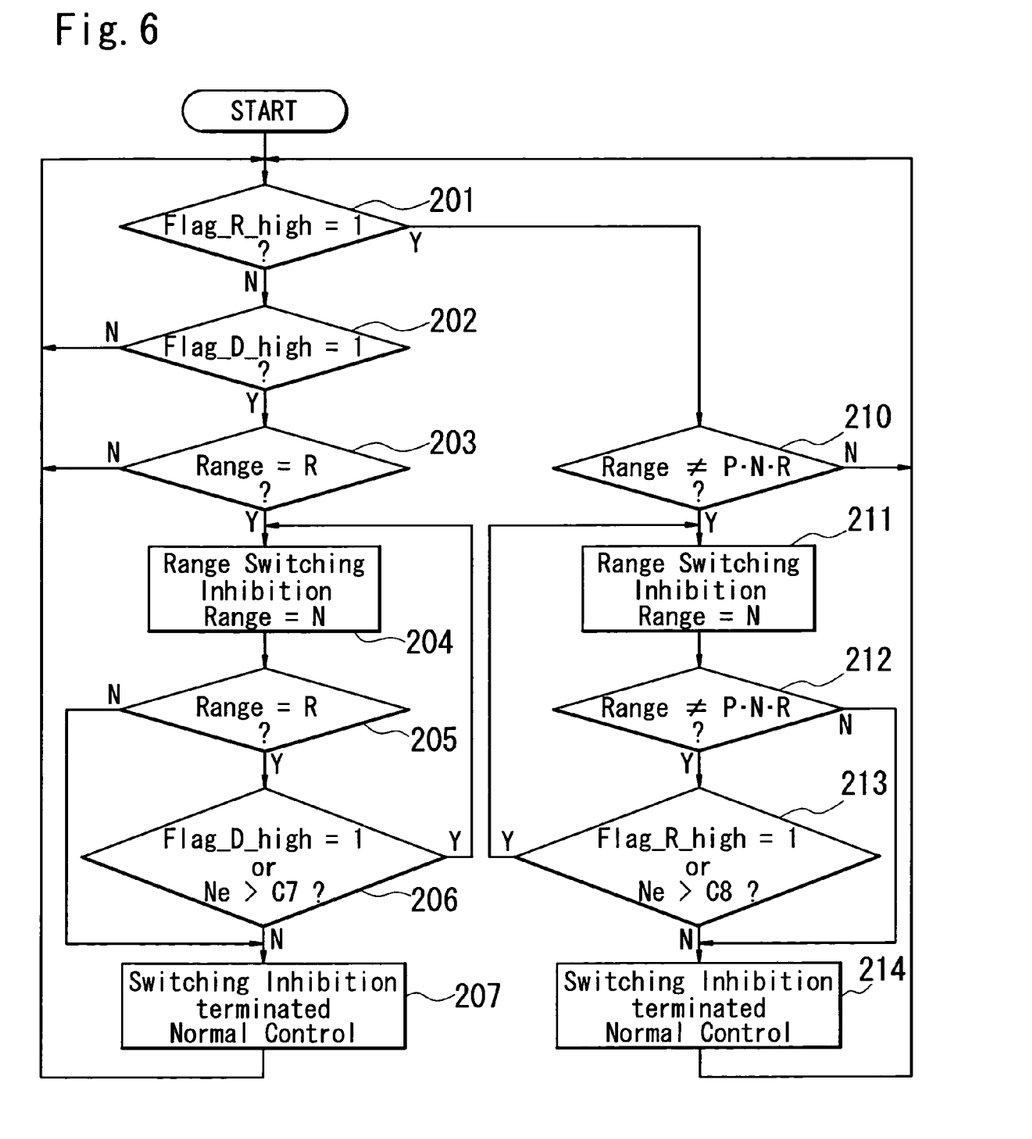
FIG. 6 is a flow chart showing a switching inhibiting process.

FIG. 6 is a flow chart showing the process of providing control to inhibit switching between ranges.

When the ignition key is turned on, first, it is checked in a step 201 whether or not the reverse high-speed experience flag assumes "1" (Flag_R_high=1).

When the reverse high-speed experience flag assumes "1", the process proceeds to a step 210, and when the reverse high-speed experience flag assumes "0", the process proceeds to a step 202.

In the step 202, it is checked whether or not the forward high-speed experience flag assumes "1" (Flag_D_high=1).

When the forward high-speed experience flag assumes "0", the reverse high-speed experience flag also assumes "0", and hence the vehicle speed is a low speed at which engine stop never occurs even if the shift lever 50 is switched between ranges, or the shift lever 50 is positioned at the P or N range. In this case, the process returns to the step 201 to execute the above-mentioned steps again.

When the forward high-speed experience flag assumes "1", it is checked in a step 203 whether or not the shift lever 50 has been switched to the R range.

When the shift lever 50 has been switched to the R range, the process proceeds to a step 204 wherein a switching inhibiting process (Range Switching Inhibition) is carried out. Specifically, selecting the R range in the forward high-speed driving state is determined as being an erroneous operation, and therefore gear shift to the gear position in the selected R range is inhibited from being accomplished, and here, gear shift to the N range is accomplished.

Next, in a step 205, it is checked whether or not the shift lever 50 is still positioned at the R range.

When the shift lever 50 is still positioned at the R range, the process proceeds to a step 206 wherein it is checked whether or not the forward high-speed experience flag still assumes "1", and whether or not the engine speed (Ne) has decreased to a predetermined value C7 or less.

When the forward high-speed experience flag still assumes "1", i.e. when the vehicle lies in the forward high-speed driving state and the shift lever 50 is positioned at the R range, or when the engine speed is higher than the predetermined value C7, the process returns to the step 204 so as to continue the switching inhibiting process by executing the above-mentioned steps again with the range being kept at the N range.

In the state in which the shift lever 50 is positioned at the R range due to the erroneous operation, the process cannot proceed to the step 113 since it is determined in the step 112 that Flag_D_high=1 even if the process proceeds from the step 102 to the step 110 in the flow chart of FIG. 5, and therefore, the reverse high-speed experience flag does not assume "1." That is, since the reverse high-speed experience flag does not assume "1", the process does not proceed from the step 201 to the step 210 and subsequent steps wherein the switching to the D range is inhibited.

Thus, when the driver notices the erroneous operation and returns the shift lever 50 to the D range or the like, and it is determined in the step 205 that the shift lever 50 is positioned at a range other than the R range and the engine speed has decreased, the process proceeds to a step 207 wherein the switching inhibiting process is terminated. For example, when the shift lever 50 is returned to the D range, a gear position is set according to the gear shift schedule shown in FIG. 3.

Even if it is determined in the step 205 that the shift lever 50 is positioned at the R range, when it is determined in the step 206 that the forward high-speed experience flag has been reset, this means that the vehicle speed has become a low speed at which hard braking or engine stop would not occur, or the vehicle is standing still and also the engine speed has satisfactorily decreased. Thus, there is no possibility of hard braking or hard acceleration even under the normal control, and therefore the process proceeds to the step 207 to carry out normal control under which gear shift to the range selected by the shift lever 50 is accomplished.

After the execution of the step 207, the process returns to the step 201.

If it is determined in the step 203 that the shift lever 50 has not been switched to the R range, it can be determined that the shift lever 50 has not been operated or at least there is no possibility of hard braking or engine stop, and hence the process returns to the step 201.

On the other hand, in the step 210 to which the process proceeds from the step 201 when the reverse high-speed experience flag assumes "1", it is checked whether or not the shift lever 50 is positioned at a range other than the P, N, and R ranges, i.e. whether or not the shift lever 50 is positioned at the D range.

When it is determined in the step 210 that the shift lever 50 has not been switched to the D range, it can be determined that the shift lever 50 has not been operated or at least there is no possibility of hard braking or engine stop, and hence the process returns to the step 201.

When it is determined in the step 210 that the shift lever 50 has been switched to the D range, the process proceeds to a step 211 wherein a switching inhibiting process is carried out. Specifically, selecting the D range in the reverse high-speed driving state is determined as being an erroneous operation of the shift lever 50, and therefore gear shift to the selected D range is inhibited from being accomplished, and here, gear shift to the N range is accomplished.

Next, in a step 212, it is checked whether or not the shift lever 50 is still positioned at the D range.

When the shift lever 50 is still positioned at the D range, the process proceeds to a step 213 wherein it is checked whether or not the reverse high-speed experience flag still assumes "1", and whether or not the engine speed (Ne) has not decreased to a predetermined value C8 or less.

When the reverse high-speed experience flag still assumes "1", i.e. when the vehicle lies in the reverse high-speed driving state and the shift lever 50 is positioned at the D range, or when the engine speed is higher than the predetermined value C8, the process returns to the step 211 so as to execute the above-mentioned steps again with the range being kept at the N range.

In the state in which the shift lever 50 is positioned at the D range due to the erroneous operation, the process cannot proceed to the step 107 since it is determined in the step 106 that Flag_R_high=1 even if the process proceeds from the step 102 to the step 103 and the subsequent steps in the flow chart of FIG. 5, and therefore, the forward high-speed experience flag does not assume "1." That is, since the forward high-speed experience flag does not assume "1", the process does not proceed from the step 201 to the step 202 and the subsequent steps wherein the switching to the R range is inhibited.

Thus, when the driver notices the erroneous operation and returns the shift lever 50 to the R range or the like, and it is determined in the next step 212 that the shift lever 50 is positioned at a range other than the D range and the engine speed has decreased, the process proceeds to a step 214 wherein the switching inhibiting process is terminated to carry out normal control such that gear shift to the range selected by the shift lever 50 is accomplished.

Even if it is determined in the step 212 that the shift lever 50 is positioned at the D range, when it is determined in the step 213 that the reverse high-speed experience flag has been reset, this means that the vehicle speed has become a low speed at which hard braking or engine stop would not occur, or the vehicle is standing still, and also the engine speed has satisfactorily decreased. Thus, there is no possibility of hard braking or hard acceleration even when normal control is carried out, and hence the process proceeds to the step 214 to carry out normal control such that gear shift to the range (D) selected by the shift lever 50 is accomplished.

The steps 103 to 109 in the flow chart of FIG. 5 constitute a forward driving determining means of the present invention, and the step 102 and 110 to 115 in the flow chart of FIG. 5 constitute a reverse driving determining means of the present invention. In particular, the determination of Flag_D_high=1 in the step 107 corresponds to the determination in claim 1 that "the vehicle is running forward", and the determination of Flag_R_high=1 in the step 113 corresponds to the determination in claim 1 that "the vehicle is running rearward."

The steps 202 and 203 constitute a first erroneous operation determining means of the invention, and the step 204 constitutes a first inhibiting means. The steps 205 and 207 constitute a first permitting means.

The steps 201 to 210 constitute a second erroneous operation determining means of the invention, and the step 211 constitutes a second inhibiting means. The steps 212 and 214 constitute a second permitting means.

The predetermined value C1 of the vehicle speed corresponds to a first predetermined value, the predetermined value C4 to a second predetermined value, the predetermined value C2 to a third predetermined value, and the predetermined value C5 to a fourth predetermined value. The predetermined time period T1 corresponds to a first predetermined time period, and the predetermined time period T2 corresponds to a second predetermined time period.

As described above, according to the embodiment of the present invention, when the shift lever 50 is switched from the forward range to the reverse range in the high-speed driving state with the forward high-speed experience flag assuming "1", the operation of the shift lever 50 is determined as being an erroneous operation, and accomplishment of gear shift to a reverse gear position is inhibited. On the other hand, when the shift lever 50 is switched from the reverse range to the forward range in the high-speed driving state with the reverse high-speed experience flag assuming "1", the operation of the shift lever 50 is determined as being an erroneous operation, and accomplishment of gear shift to a forward gear position is inhibited. As a result, engine stop due to an erroneous operation can be prevented.

Also, when the shift lever 50 is switched from the reverse range to any other range while accomplishment of gear shift to a reverse gear position is inhibited, or when the shift lever 50 is switched from the forward range to any other range while accomplishment of gear shift to a forward gear position is inhibited, the inhibition is terminated to carry out normal control such that gear shift to the range selected by the shift lever 50 is accomplished. Thus, the range can be returned to the previous range selected before the erroneous operation, so that the vehicle can continue to run normally.

Since the forward high-speed experience flag assumes "1" when the vehicle speed is not less than the predetermined value C1, and the reverse high-speed experience flag assumes "1" when the vehicle speed is not less than the predetermined value C4, engine stop can be reliably prevented with high accuracy by appropriately setting the predetermined values.

Further, since the forward high-speed experience flag assumes "1" even when the vehicle speed has been continuing to be not less than the predetermined value C1 smaller than the predetermined value C1 for the predetermined time period T1 or longer, and the reverse high-speed experience flag assumes "1" even when the vehicle speed has been continuing to be not less than the predetermined value C5 smaller than the predetermined value C4 for the predetermined time period T2 or longer, it is possible to prevent occurrence of a great shock each time the vehicle is turned in a K-turn in a parking lot or the like.

Also, since the predetermined value C4 of the vehicle speed for use in making a determination as to erroneous operation when the vehicle is running rearward is set to be lower than the predetermined value C1 of the vehicle speed for use in making a determination as to erroneous operation when the vehicle is running forward, the engine speed which is the condition for starting the control to inhibit switching between the forward range and the reverse range can be substantially the same whether the vehicle is running forward or rearward, even though gear ratios of the forward range and reverse range are different each other. As a result, stable switching inhibition performance can be obtained.

It should be noted that numeric values such as the predetermined values C1 to C6 in the above described embodiment are given for purposes of illustration and not limitation, and may be arbitrarily set according to vehicle characteristics.

Also, although in the above described embodiment, the reverse range is comprised of one speed gear position and the forward range is comprised only of the D range with six speed gear positions, this is not limitative, but the present invention may be applied to an automatic transmission having a reverse range with a plurality of gear positions and forward ranges comprised of "1" and "2" ranges as well as the D range.

What is claimed is:

1. A control apparatus for an automatic transmission in which a range from a forward range and a reverse range is selected by switching of a shift lever, comprising:

first erroneous operation determining means responsive to an operation to switch the shift lever from the forward range to the reverse range when a first condition is met, for determining that the operation is an erroneous operation;

first inhibiting means for inhibiting accomplishment of gear shift to a reverse gear position when said first erroneous operation determining means determines that the operation is an erroneous operation;

second erroneous operation determining means responsive to an operation to switch the shift lever from the reverse range to the forward range when a second condition is met, for determining that the operation is an erroneous operation;

second inhibiting means for inhibiting accomplishment of gear shift to a forward gear position when said second erroneous operation determining means determines that the operation is an erroneous operation;

first permitting means for accomplishing gear shift to a gear position in a forward range selected by the shift lever without activating said second inhibiting means when the shift lever is switched from the reverse range to the forward range when accomplishment of gear shift to a reverse gear position is inhibited by said first inhibiting means being in operation, and the driving condition is such that said second condition is met.

2. A control apparatus for an automatic transmission in which a range from a forward range and a reverse range is selected by switching of a shift lever, comprising:

first erroneous operation determining means responsive to an operation to switch the shift lever from the forward range to the reverse range when a first condition is met, for determining that the operation is an erroneous operation;

first inhibiting means for inhibiting accomplishment of gear shift to a reverse gear position when said first erroneous operation determining means determines that the operation is an erroneous operation;

second erroneous operation determining means responsive to an operation to switch the shift lever from the reverse range to the forward range when a second condition is met, for determining that the operation is an erroneous operation;

second inhibiting means for inhibiting accomplishment of gear shift to a forward gear position when said second erroneous operation determining means determines that the operation is an erroneous operation; and second permitting means for accomplishing gear shift to a gear position in the reverse range selected by the shift lever without activating said first inhibiting means when the shift lever is switched from the forward range to the reverse range while accomplishment of gear shift to a forward gear position is inhibited by said second inhibiting means being in operation, and the driving condition is such that said first condition is met.

3. A control apparatus for an automatic transmission according to claim 1 or claim 2, wherein the first condition is a state in which a vehicle speed is not less than a first predetermined value, and the second condition is a state in which a vehicle speed is not less than a second predetermined value.

4. A control apparatus for an automatic transmission according to claim 3, wherein the first condition includes a state in which the vehicle speed continues to be not less than a third predetermined value lower than the first predetermined speed for a time period not less than a first predetermined time period, and the second condition includes a state in which the vehicle speed continues to be not less than a fourth predetermined value lower than the second predetermined speed for a time period not less than a second predetermined time period.

5. A control apparatus for an automatic transmission according to claim 3 or claim 4, wherein the second predetermined value is set to be smaller than the first predetermined value.

6. A control apparatus for an automatic transmission in which a range from a forward range and a reverse range is selected by switching of a shift lever and a gear position is determined based on the selected range, comprising:

forward driving determining means for determining that a vehicle is running forward when the shift lever is positioned at the forward range and a vehicle speed lies in a first forward high-speed driving state and cancels the determination that the vehicle is running forward when the vehicle speed has decreased to not more than a predetermined vehicle speed lower than the vehicle speed in the first high-speed driving state;

reverse driving determining means for determining that a vehicle is running rearward when the shift lever is positioned at the reverse range and a vehicle speed lies in a second forward high-speed driving state and cancels the determination that the vehicle is running rearward when the vehicle speed has decreased to not more than a predetermined vehicle speed lower than the vehicle speed in the second high-speed driving state;

first inhibiting means for inhibiting accomplishment of gear shift to a reverse gear position when the reverse range is selected while said forward driving determining means determines that the vehicle is running forward; and second inhibiting means for inhibiting accomplishment of gear shift to a forward gear position when the forward range is selected while said reverse driving determining means determines that the vehicle is running rearward, wherein forward driving determining means avoids the determination by said forward driving determining means that the vehicle is running forward when said reverse driving determining means has already determined that the vehicle is running rearward, thus enabling accomplishment of gear shift to the reverse gear position when once again the reverse range is selected, and reverse driving determining means avoids the determination by said reverse driving determining means that the vehicle is running rearward when said forward driving determining means has already determined that the vehicle is running forward, thus enabling accomplishment of gear shift to a gear position in the forward range when once again the forward range is selected.

7. A control apparatus for an automatic transmission according to claim 6, wherein
the first high-speed driving state is a state in which a vehicle speed is not less than a first predetermined value, and
the second high-speed driving state is a state in which a vehicle speed is not less than a second predetermined value.

8. A control apparatus for an automatic transmission according to claim 7, wherein
the first high-speed driving state includes a state in which the vehicle speed continues to be not less than a third predetermined value lower than the first predetermined speed for a time period not less than a first predetermined time period, and
the second high-speed driving state includes a state in which the vehicle speed continues to be not less than a fourth predetermined value lower than the second predetermined speed for a time period not less than a second predetermined time period.

9. A control apparatus for an automatic transmission according to claim 7 or claim 8, wherein the second predetermined value is set to be smaller than the first predetermined value.

* * * * *